US011835126B2

(12) United States Patent
Deport et al.

(10) Patent No.: US 11,835,126 B2
(45) Date of Patent: Dec. 5, 2023

(54) MECHANICAL SYSTEM PROVIDED WITH A SUMP RECEIVING, ABOVE COMPONENTS TO BE LUBRICATED OR COOLED, A TANK OF A LUBRICATING FLUID SYSTEM

(71) Applicant: AIRBUS HELICOPTERS, Marignane (FR)

(72) Inventors: Stephane Deport, Aix en Provence (FR); Olivier Barais, Ensues la Redonne (FR); Jerome Geneix, Miramas le Vieux (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/121,861

(22) Filed: Mar. 15, 2023

(65) Prior Publication Data

US 2023/0323941 A1 Oct. 12, 2023

(30) Foreign Application Priority Data

Apr. 7, 2022 (FR) ...................................... 2203178

(51) Int. Cl.
*F16H 57/04* (2010.01)
*F16N 7/02* (2006.01)
(Continued)

(52) U.S. Cl.
CPC ..... *F16H 57/0441* (2013.01); *F16H 57/0438* (2013.01); *F16H 57/0442* (2013.01);
(Continued)

(58) Field of Classification Search
CPC ................. F16H 57/04; F16H 57/0438; F16H 2057/02043; F16N 7/02; F16N 7/385
(Continued)

(56) References Cited

U.S. PATENT DOCUMENTS 3,562,657 A 2/1971 Locherer et al.
5,121,815 A * 6/1992 Francois ................. B64C 27/12
184/6.12
(Continued)

FOREIGN PATENT DOCUMENTS

EP 0696697 A1 2/1996
EP 3647206 A1 5/2020
(Continued)

OTHER PUBLICATIONS

French Search Report for French Application No. FR2203178, Completed by the French Patent Office, dated Nov. 18, 2022, 10 pages.

*Primary Examiner* — Michael R Mansen
*Assistant Examiner* — Mark K Buse
(74) *Attorney, Agent, or Firm* — BROOKS KUSHMAN P.C.

(57) ABSTRACT

A mechanical system comprising a sump and at least one component to be lubricated or cooled arranged in the sump, the mechanical system comprising a lubricating fluid system provided with a lubricating fluid and a tank arranged in the sump. The tank is a leaking tank and is situated above said at least one component to be lubricated or cooled, the lubricating fluid flowing out of the tank by force of gravity, so as to reach said at least one component to be lubricated or cooled. The lubricating fluid system has at least one lift flow generator connected by at least one filling line to the tank and to at least one suction point present in a bottom of the sump. The lift flow generator fills the tank with the lubricating fluid present in said bottom at least during a starting phase.

13 Claims, 6 Drawing Sheets

(51) Int. Cl.
  *F16N 7/38* (2006.01)
  *F16H 57/02* (2012.01)
(52) U.S. Cl.
  CPC .......... F16H 57/0443 (2013.01); F16N 7/02 (2013.01); F16N 7/385 (2013.01); *F16H 2057/02043* (2013.01); *F16N 2210/12* (2013.01); *F16N 2250/04* (2013.01); *F16N 2260/04* (2013.01); *F16N 2260/06* (2013.01); *F16N 2260/08* (2013.01)
(58) Field of Classification Search
  USPC ..................................................... 184/6.4, 6
  See application file for complete search history.

(56) References Cited

U.S. PATENT DOCUMENTS

| | | | | |
|---|---|---|---|---|
| 10,746,284 | B2* | 8/2020 | Gmirya | F16H 57/0435 |
| 10,844,948 | B2* | 11/2020 | De Meerschman | F16H 57/045 |
| 2002/0175026 | A1 | 11/2002 | Varailhon et al. | |
| 2010/0025159 | A1* | 2/2010 | Gmirya | F16N 17/00 184/6.4 |
| 2016/0123456 | A1* | 5/2016 | Goujet | F16H 57/0452 184/6.4 |
| 2016/0123457 | A1* | 5/2016 | Harreau | F16H 57/0435 184/6.4 |
| 2016/0369887 | A1* | 12/2016 | Sheridan | F16H 57/045 |
| 2017/0175875 | A1* | 6/2017 | Lapeyre | F16H 57/045 |
| 2018/0106360 | A1* | 4/2018 | Gmirya | F16H 57/0456 |
| 2020/0122824 | A1* | 4/2020 | Akahori | F16H 57/0435 |
| 2020/0271194 | A1* | 8/2020 | Takahashi | F16H 57/037 |
| 2020/0340574 | A1* | 10/2020 | Sbabo | F16H 57/045 |
| 2022/0107018 | A1* | 4/2022 | Zamponi | F16N 7/32 |

FOREIGN PATENT DOCUMENTS

| | | |
|---|---|---|
| FR | 2010022 A1 | 2/1970 |
| FR | 2658577 A1 | 8/1991 |
| FR | 2798983 A1 | 3/2001 |
| FR | 3047764 A1 | 8/2017 |

* cited by examiner

MECHANICAL SYSTEM PROVIDED WITH A SUMP RECEIVING, ABOVE COMPONENTS TO BE LUBRICATED OR COOLED, A TANK OF A LUBRICATING FLUID SYSTEM

CROSS REFERENCE TO RELATED APPLICATIONS

This application claims priority to French patent application No. FR 2203178 filed on Apr. 7, 2022, the disclosure of which is incorporated in its entirety by reference herein.

TECHNICAL FIELD

The present disclosure relates to a mechanical system provided with a sump receiving, above components to be lubricated or cooled, a tank of a lubricating fluid system.

The present disclosure relates to the field of lubrication and cooling of mechanical systems and, in particular, gearboxes, in particular gearboxes intended for a rotary-wing aircraft.

BACKGROUND

A rotary-wing aircraft such as a rotorcraft comprises a rotor providing at least partial lift for that aircraft. In order to set such a rotor in rotation, a rotorcraft is provided with a power plant comprising at least one engine. Furthermore, a gearbox may be interposed between at least one engine and at least one rotor. A gearbox comprises components to be lubricated or cooled, such as gears, speed-reduction systems or the like. A lubricating fluid system allows a lubricating fluid to be conveyed to components in order to lubricate and/or cool them. Such components are referred hereinafter to as "components to be lubricated or cooled".

According to a first technical solution, a lubricating fluid system comprises a single fluid circuit. This fluid circuit comprises a fluid residing in a tank formed by the bottom of a sump of the mechanical system to be lubricated or cooled. Moreover, the fluid circuit is provided with a pump drawing fluid from the tank of the mechanical system via a strainer. The pump then moves the fluid to at least one fluid spray circuit, sometimes referred to as a "lubrication manifold" or indeed as a "fluid spray manifold". The fluid is then expelled out of the fluid spray circuit in order to reach the components to be lubricated or cooled before returning by force of gravity into the bottom of the sump. The fluid circuit may optionally comprise a cooler, a heater, and indeed a filter upstream of the fluid spray circuit. The term "heater" denotes a device capable of increasing the temperature of a fluid, as opposed to a cooler.

A mechanical system having a sump provided with a bottom forming a tank of lubricating fluid is conventionally referred to as a "wet sump".

Though effective, such a lubricating fluid system with a wet sump is susceptible to unwanted leakage. Regulations may require the mechanical system to operate for a minimum time period in the event of a failure or leak in the lubricating fluid system. For example, a regulation may require a gearbox of a rotorcraft to be able to continue to operate for thirty minutes following a failure of its lubricating fluid system.

A fluid system may then comprise a main fluid circuit of the type described above and a back-up fluid circuit. The main fluid circuit and the back-up fluid circuit are configured to draw up lubricating fluid from the bottom of a sump of a mechanical system and to convey that fluid to a single fluid spray circuit or separate fluid spray circuits. The back-up fluid circuit is then configured to replace the main fluid circuit if necessary, for example if there is a drop in pressure in the main fluid circuit.

The purpose of the back-up fluid circuit is to allow the mechanical system to operate at least for a predetermined time period in the event of failure of the main fluid circuit.

A mechanical system may also be tilted to various degrees during use. For example, an aircraft may have attitude angles that vary in the authorized flight envelope. In particular, a rotorcraft provided with a wing and at least one propeller may reach considerable nose-up or nose-down angles. In the event of substantial tilting, a component to be lubricated or cooled of the mechanical system may be at least partially submerged in the lubricating fluid, which may give rise to undesired heating of the fluid and/or of the component to be lubricated or cooled by splashing effect.

The lubricating fluid system of an aircraft may be dimensioned to take this aspect into account. In particular, the lubricating fluid system may be dimensioned to convey a lubricating fluid onto components of a gearbox in the whole of the authorized flight envelope, and to prevent splashing of certain components in the whole of the authorized flight envelope and, in particular, when substantial tilting is taking place.

In particular, the wet sump of a mechanical system may be designed to prevent a component to be lubricated or cooled from splashing into the fluid situated in the bottom of the mechanical system at certain authorized tilt angles. Alternatively, or additionally, pumps may move the fluid present in one zone of the bottom of the sump to another zone of the bottom of the sump in order to prevent a splashing phenomenon.

Therefore, the sump of the mechanical system may have complex shapes. Such a sump may therefore have a significant space requirement, which may have an impact on the arrangement of the mechanical system, for example in an aircraft.

According to another example, a lubricating fluid system may comprise a tank not formed by the sump of the mechanical system to be lubricated, but situated outside the mechanical system. A first pump conveys the fluid contained in the bottom of the sump of the mechanical system to the tank. A second pump conveys the fluid from the tank to components to be lubricated or cooled of the mechanical system, this fluid then returning by force of gravity to the bottom of the sump in order to be drawn up by the first pump. The lubricating fluid is then not stored in the bottom of the sump of the mechanical system. The sump is then referred to as a dry sump as opposed to a wet sump. Such a system is advantageous because the bottom of the mechanical system does not contain a volume of lubricating fluid in which a component to be lubricated or cooled of the mechanical system may splash. However, such a system runs the risk of external leakage, i.e., leakage out of the mechanical system and, for example, between the mechanical system and the tank.

Patent FR 3 047 764 describes a mechanical system with a wet sump provided with a lubricating fluid system. The lubricating fluid system comprises a main fluid circuit of the type described above. Moreover, the lubricating fluid system comprises a back-up fluid circuit comprising a single use dedicated internal tank. This internal tank comprises a container situated above the components to be lubricated or cooled, not in the bottom of the sump of the mechanical system. The container is connected to the fluid spray circuit by a triggering means. In the event of failure of the main fluid circuit, the tank supplies the fluid spray circuit of the main fluid circuit, by force of gravity.

Patent U.S. Pat. No. 10,844,948 B2 describes a mechanical system with a wet sump comprising a main tank supplying fluid to at least one fluid spray circuit via at least one fluid circuit. A portion of the sprayed fluid drops back into the main tank and into at least one recovery tank by force of gravity. Each recovery tank supplies fluid to the main tank via a conveying system that comprises an ejector. Each ejector is connected to at least one fluid circuit.

An ejector is a known component. As a result of a primary flow of fluid, the ejector may draw in a secondary flow of fluid. The primary and secondary flows are mixed in the ejector before being ejected out of the ejector together. An ejector is sometimes referred to as a "jetpump" or as a "jet ejector pump".

Patent FR 2 010 022 describes a mechanical system with a wet sump comprising a lubrication system. The lubrication system comprises a main tank formed by the bottom of the sump of the mechanical system and containing a lubricating fluid. The lubrication system further comprises a main flow generator and devices for spraying the lubricating liquid for conveying the lubricating fluid from the tank towards components to be lubricated, the fluid then falling into the main tank by force of gravity. Thus, the main lubrication circuit has a main suction point for drawing in lubricating fluid situated in the main tank, a main suction line connecting the suction point to the main flow generator.

Moreover, the lubrication system comprises a reserve tank filled with a lubricating fluid. The reserve tank comprises an inlet for receiving a portion of the lubricating fluid. Furthermore, an outlet line connects the reserve tank to the main suction line.

Documents FR 2 658 577 A1, US 2020/271194 A1, EP 0 696 697 A1, EP 3 647 206 A1 and FR 2 798 983 A1 describe systems having pumps for filling tanks.

SUMMARY

The object of the present disclosure is therefore to propose an innovative mechanical system intended to prevent the splashing of components to be lubricated or cooled when the mechanical system is tilted substantially from an initial rest position.

The present disclosure therefore relates to a mechanical system comprising a sump and at least one component to be lubricated or cooled arranged in the sump, or indeed several components to be lubricated or cooled, the mechanical system comprising a lubricating fluid system provided with a lubricating fluid and a tank arranged in the sump.

The tank is a leaking tank and is situated above said at least one component to be lubricated or cooled, the lubricating fluid flowing out of the tank, in particular naturally and therefore without external action, by force of gravity, so as to reach said at least one component to be lubricated or cooled, the lubricating fluid system comprising at least one lift flow generator connected by at least one filling line to the tank and to at least one suction point present in a bottom of the sump, said lift flow generator being configured to fill the tank with the lubricating fluid present in said bottom at least during a starting phase.

The term "leaking" means that the lubricating fluid contained in an enclosure of the tank flows permanently out of it without external action, i.e., without activating a pump or a valve, for example. The tank is for permanent use, at least after the starting phase, unlike a single-use reserve tank.

The component or components to be lubricated or cooled may comprise components that need to be lubricated and/or cooled. When at rest, these components are stationary, and they may move during operation. Such components may comprise toothed wheels, pinions, ring gears, rolling members, components of a rotational speed reducing or increasing device, etc.

Therefore, when the mechanical system is at rest, the tank automatically empties at least partially and possibly completely, depending on the embodiment, into the bottom of the sump under the sole effect of the earth's gravity. To this end, the tank may comprise an unsealed enclosure, this enclosure comprising at least one drainage hole that cannot be closed. The drainage hole may be arranged at a low point of the tank.

The sump may then be shaped in such a way as to prevent the component or components to be lubricated or cooled from being immersed in the lubricating fluid when at rest, i.e., for example when the tilt is relatively gentle. Optionally, a component to be lubricated or cooled may be reached by the lubricating fluid, but the mechanical system is not subject to a splashing phenomenon because the mechanical system is stationary.

During a starting phase, the mechanical system may be set in motion. Moreover, the lift flow generator is activated and transfers the lubricating fluid from the bottom of the sump to the tank. The tank fills with lubricating fluid as the bottom of the sump empties.

At the end of the starting phase, the bottom of the sump of the mechanical system therefore contains little or almost no lubricating fluid. The mechanical system is in motion. The lubricating fluid is then distributed by the tank to the component or components to be lubricated or cooled at least by force of gravity through a drainage hole and at a possibly reduced leakage flow rate.

Therefore, at rest, at least some of the lubricating fluid resides in the bottom of the sump, like in a mechanical system with a wet sump. Indeed, the tank is permanently leaking. The fluid system has no means to prevent it from flowing out when at rest, such as a valve.

During an operating phase, the lubricating fluid is transferred into the tank situated in the top part of the mechanical system and flows from the tank towards the component or components to be lubricated or cooled, at least by force of gravity. The lubricating fluid that drops to the bottom of the sump of the mechanical system is permanently re-conveyed to the tank by a fluid transfer device, during use, this fluid transfer device possibly comprising the lift flow generator or indeed another flow generator. Like in a dry sump system, the bottom of the sump therefore does not contain a volume of lubricating fluid in which one or more components to be lubricated or cooled may be at least partially submerged when the mechanical system is substantially tilted. In particular, in an aircraft, the bottom of the tank does not contain enough lubricating fluid for a component to be lubricated or cooled to splash, for example when an aircraft is carrying out a nose-up or nose-down manoeuvre.

Therefore, the mechanical system is neither a dry sump system nor a wet sump system in the conventional sense of the terms, but is rather an innovative hybrid system. This mechanical system may undergo substantial tilting without experiencing a harmful phenomenon of splashing of components to be lubricated or cooled.

Furthermore, the tank is located in a top part of the mechanical system, being arranged above the component or components to be lubricated or cooled. The term "above" is to be considered when the mechanical system is located in a predetermined rest position, the lowest point of the tank being situated in a horizontal plane positioned above the component or components to be lubricated or cooled in order for the lubricating fluid to be able to reach the component or components to be lubricated or cooled only under the effect of gravity. As a result of this arrangement, the lubricating fluid may have a tendency to heat up less than a wet sump system.

The mechanical system may also comprise one or more of the following features.

According to one possibility, the tank may be a leaking tank having a leakage flow rate less than a supply flow rate of lubricating fluid in the filling line.

During the starting phase, the tank therefore fills with the fluid previously contained in the bottom of the sump.

According to one possibility compatible with the preceding possibilities, the mechanical system may be configured to be able to move within a predetermined movement space in relation to a reference frame of this mechanical system, said sump comprising, at the end of the starting phase, a volume of lubricating fluid less than a predetermined volume allowing at least one component to be lubricated or cooled to be at least partially submerged, or indeed each component to be lubricated or cooled, when said mechanical system moves in said predetermined movement space.

At the end of the starting phase, the sump comprises a volume of lubricating fluid less than the volume present in the bottom of the sump at rest. Therefore, the component or components to be lubricated or cooled are not subjected to a splashing phenomenon during the operation of the mechanical system.

According to one possibility compatible with the preceding possibilities, the lubricating fluid system may comprise at least one fluid circuit provided with a distribution pump connected to the tank by a hydraulic inlet connection, i.e., downstream from this tank with regard to a direction of flow of the lubricating fluid, the fluid circuit having a hydraulic outlet network comprising at least one distribution circuit configured to eject said lubricating fluid towards at least one component to be lubricated or cooled, the distribution pump being connected to the hydraulic outlet network and configured to draw up the lubricating fluid from the tank and make said lubricating fluid flow from the hydraulic inlet connection to the hydraulic outlet network. Therefore, the lubricating fluid is drawn from the tank and then flows through the hydraulic inlet connection and then through the hydraulic outlet network.

The fluid system therefore comprises one or more fluid circuits for supplying lubricating fluid to one or more distribution circuits, simultaneously, jointly or one after another.

In a normal operating mode, at least one fluid circuit directs the lubricating fluid to the component or components to be lubricated or cooled. In parallel, the tank leaks through at least one drainage hole towards the component or components to be lubricated or cooled. In the event of a leak in the fluid circuit, the tank continues, immediately and without the activation of a dedicated component, to direct the lubricating fluid that it contains towards the component or components to be lubricated or cooled. Therefore, this system helps guarantee a minimum operating time following a failure, for a period of time depending on the volume of the tank. The tank and its leakage flow rate may be dimensioned to comply with existing regulations or indeed to achieve better performances than required by such regulations, for example to attain a minimum operating time of the mechanical system of 30 minutes or indeed longer when there is leakage out of the tank.

Several fluid circuits may have at least one shared distribution circuit.

The tank may optionally leak towards a distribution circuit. Indeed, the tank may comprise a drainage hole connected to one or more distribution circuits by at least one pipe.

According to one possibility compatible with the preceding possibilities and for at least one fluid circuit, said tank may comprise a leaking enclosure and at least one collector tank arranged in said enclosure, said collector tank being configured to overflow into the enclosure and be filled with lubricating fluid by the enclosure at the end of the starting phase, said hydraulic inlet connection running from said collector tank to the distribution pump.

Therefore, the enclosure is a leaking enclosure in order to have the leakage flow rate disclosed above and allow the lubricating fluid to flow out of the tank by force of gravity in order to reach the component or components to be lubricated or cooled.

Conversely, at least one collector tank is arranged in the enclosure. The collector tank comprises a container that does not leak, but may overflow into the enclosure.

Therefore, the enclosure empties at rest into the bottom of the sump while the collector tank remains filled with lubricating fluid. During the starting phase, the collector tank supplies fluid to at least one fluid circuit, and possibly the lift flow generator.

According to one possibility compatible with the preceding possibilities and for at least one fluid circuit, the hydraulic outlet network may comprise, upstream of said at least one distribution circuit, one or more of the following members: a cooler, a heater, a filter, a pressure relief connection opening into said sump, a pressure sensor, a particle counter.

When there are several fluid circuits, as disclosed hereinafter in greater detail, at least one or indeed each fluid circuit may comprise one or more of these members.

Various possibilities that are compatible with each other and with those mentioned previously may be used to create a lift flow generator.

According to one possibility compatible with the preceding possibilities, said at least one lift flow generator may comprise at least one electromechanical priming pump connected to at least one suction point and to the tank.

The priming pump may optionally be a dedicated pump. The priming pump is configured to transfer, alone or in combination with other systems, the lubricating fluid from the bottom of the sump to the tank, optionally only during the starting phase or a back-up phase.

For example, such a priming pump may in particular be implemented in the absence of a collector tank in order to fill the tank before setting the component or components to be lubricated or cooled in motion.

According to one possibility compatible with the preceding possibilities, said at least one lift flow generator may comprise an ejector having an outlet hydraulically connected to the tank, said ejector having a first inlet hydraulically connected to the at least one suction point, for example via a supply line comprising said at least one suction point, said ejector having a second inlet hydraulically connected to the hydraulic outlet network.

During the starting phase, the distribution pump supplies the hydraulic outlet network, optionally from a collector tank of the tank, and the ejector. This ejector draws up the lubricating fluid from the bottom of the sump to fill the tank.

A single pump allows the lubricating fluid to be transferred from the tank to at least one distribution circuit and from the bottom of the sump to the tank.

Said hydraulic outlet network may optionally comprise a narrowed section between the ejector and the distribution pump.

Such a narrowed section may be used to obtain a predetermined pressure in the ejector.

Additionally, or alternatively, a lift flow generator may comprise an ejector having an outlet hydraulically connected to the tank, said ejector having a first inlet hydraulically connected to at least one suction point optionally via a supply line comprising said at least one suction point, said ejector having a second inlet hydraulically connected to an injection pump, said injection pump being hydraulically connected to the tank, i.e., to its enclosure or to its collector tank.

In this case, an injection pump separate from the possible fluid circuit supplies an ejector that conveys the lubricating fluid from the bottom of the sump to the tank.

According to one possibility compatible with the preceding possibilities, and irrespective of the nature of the fill flow generator or generators, the lubricating fluid system may comprise at least two fluid circuits opening onto at least one distribution circuit, each fluid circuit being provided with its own distribution pump connected to the tank by its own hydraulic inlet connection and its own hydraulic outlet network.

Several fluid circuits may be provided, for safety purposes.

For example, said two fluid circuits may comprise a main circuit and a back-up circuit that can be used in the event of failure of the main circuit.

According to one possibility compatible with the preceding possibilities, and irrespective of the nature of the fill flow generator or generators, said at least one lift flow generator may comprise several lift flow generators.

For example, several flow generators communicate with different suction points distributed in the mechanical system, possibly in zones where lubricating fluid may potentially be retained. Such an architecture may also be advantageous when the mechanical system comprises several interfaced modules having respective local low points.

For example, the mechanical system then comprises several ejectors, which may be connected to the same hydraulic network.

According to one possibility, several ejectors forming fill flow generators may have different features. For example, at least one ejector may have geometry designed to function in an optimal manner with a weak flow of lubricating fluid, possibly so as to provide a high level of performance during a power increase phase at startup, and at least one other ejector may have geometry designed to function in an optimal manner with a strong flow of lubricating fluid, possibly attained after the power increase phase.

In addition to a mechanical system, the disclosure relates to an aircraft provided with a gearbox setting a rotor in motion, this gearbox being such a mechanical system.

The disclosure also relates to a method for lubricating a mechanical system comprising a sump and at least one component to be lubricated or cooled arranged in the sump, the mechanical system comprising a lubricating fluid system provided with a lubricating fluid and a tank arranged in the sump.

This method comprises the following steps:
i) during a starting phase, emptying a bottom of said sump by transferring said lubricating fluid at rest in said bottom to a tank situated above said at least one component to be lubricated or cooled, the component or components to be lubricated or cooled being stationary or in motion;
ii) during an operating phase, in particular during a nominal operating phase without undesirable failures and leaks, lubricating said at least one component to be lubricated or cooled with the lubricating fluid contained in the tank, the components to be lubricated or cooled being in motion; and
iii) during the operating phase, transferring the lubricating fluid dropping by force of gravity into the bottom to the tank.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Three directions X, Y, and Z orthogonal to each other are shown in the figures. The first direction X is referred to as the longitudinal direction. The second direction Y is referred to as the transverse direction. Finally, the third direction Z is referred to as the direction in elevation.

FIGS. 1 to 5 show mechanical systems 100.

Figure 1:
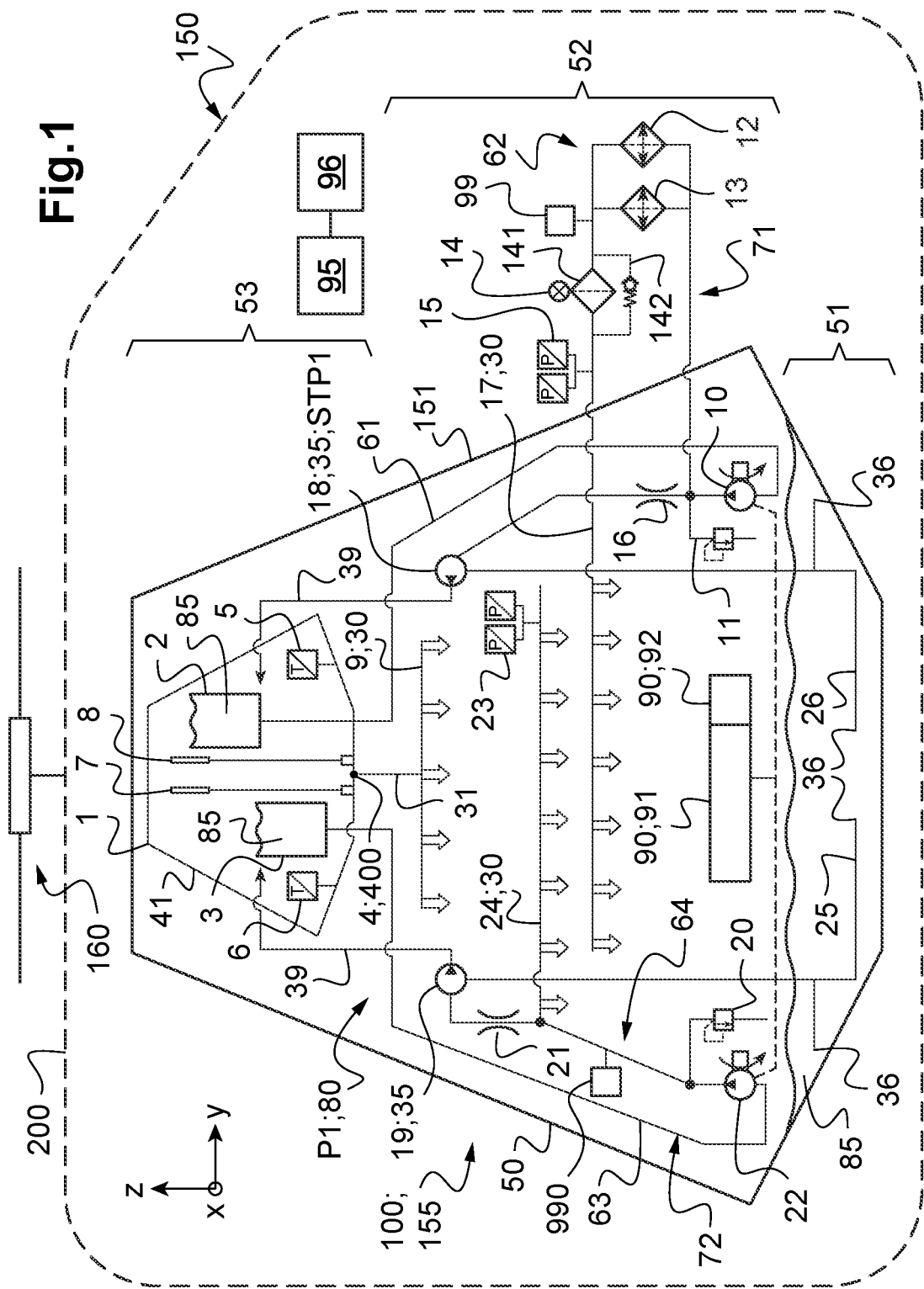
FIG. 1 is a diagram showing a mechanical system according to the disclosure during a starting phase.

Regardless of the embodiment, and in reference to FIG. 1, for example, the mechanical system 100 comprises a sump 50. The sump 50, and for example a covering 151 of the sump 50 extends upwards from a bottom 51 to a top part 53, passing through an intermediate part 52.

Moreover, the mechanical system 100 is provided with at least one component 90 to be lubricated or cooled accommodated in the intermediate part 52 of the sump 50. Therefore, the mechanical system 100 may comprise a plurality of components 91, 92 to be lubricated or cooled. The component or components 90 may be in motion when the mechanical system 100 is operating. According to examples, a component 90 may comprise moving components that may rotate, such as shafts and bearings, as well as power transmitting and speed reducing or increasing components, such as gear members.

Moreover, this mechanical system 100 may be able to move during use in relation to a reference frame X, Y, Z attached to this mechanical system 100, within a movement space 200. For example, the mechanical system 100 is able to rotate about two axes parallel to the axes X, Y within the confines of the movement space 200.

The mechanical system 100 may possibly be a gearbox 155 of an aircraft 150 rotating at least one rotor 160. This mechanical system 100 may then function with predetermined nose-up and nose-down angles.

Moreover, the mechanical system 100 comprises a lubricating fluid system 80 provided with a lubricating fluid 85 for lubricating and/or cooling each component 90. For example, the lubricating fluid 85 comprises oil.

This lubricating fluid system 80 is thus provided with a tank 1 arranged in the sump 50. The tank 50 is arranged above the component or components 90, i.e., in the top part 53 of the sump 50. The term "above" is, for example, to be considered when the mechanical system 100 is stopped, or is arranged on a support resting on the ground in a predetermined position, possibly in an aircraft positioned on a landing area.

The tank 1 may comprise an enclosure 41 suitable for receiving some of the lubricating fluid 85 during operation. This enclosure 41 may be annular in shape, for example in order to be traversed by a shaft of the mechanical system 100. The enclosure may be attached to the sump. The tank 1 may further comprise at least one collector tank 2, 3 arranged in the enclosure 41, the collector tank 2, 3 being able to overflow into the enclosure 41 and be filled with lubricating fluid 85 by the enclosure 41. The collector tank is therefore an open container, open at the top, for example, arranged in the space delimited by the enclosure.

Moreover, the tank 1 is a leaking tank. To this end, the enclosure 41 may comprise at least one drainage hole 4, for example in a low point 400 of the enclosure 41. The lubricating fluid 85 then flows out of the tank 1 and in particular the enclosure 41 of its own accord, i.e., without the action of another member, by force of gravity, in order to reach the component or components 90 to be lubricated or cooled.

For example, the drainage hole or holes 4 are connected by one or more drainage lines 31 to one or more distribution circuits 30. Such a distribution circuit 30 may comprise a distribution manifold provided with at least one fluid sprayer, such as a simple hole, a nozzle or the like. The drainage hole or holes 4 are optionally connected by one or more drainage lines 31 to a dedicated distribution circuit 9, according to the possibility shown, or may be connected to at least one shared distribution circuit.

Indeed, in order to convey the lubricating fluid 85 from the tank 1 to the component or components 90 to be lubricated or cooled, the lubricating fluid system 80 may comprise at least one other fluid circuit.

The lubricating fluid system 80 may thus comprise at least one fluid circuit 71, 72 provided with a distribution pump 10, 22.

The distribution pump 10, 22 of a fluid circuit 71, 72 may for example be a mechanical pump set in motion by at least one component 90 of the mechanical system 100. Therefore, as long as the mechanical system 100 is not in operation, the mechanical pump 10, 22 is inactive. An electromechanical pump may also be envisaged.

The distribution pump 10, 22 of a fluid circuit 71, 72 is fluidly connected to the tank 1 by a hydraulic inlet connection 61, 63 of the fluid circuit 71, 72. A hydraulic inlet connection 61, 63 may comprise one or more pipes, a valve or the like.

Furthermore, the distribution pump 10, 22 of a fluid circuit 71, 72 is fluidly connected to a hydraulic outlet network 62, 64 of this fluid circuit 71, 72. Such a hydraulic outlet network 62, 64 comprises at least one distribution circuit 30 configured to transfer the lubricating fluid 85 to at least one component 90 to be lubricated or cooled. Therefore, the distribution pump 10, 22 is configured to draw the lubricating fluid 85 from the tank 1 and make this lubricating fluid 85 flow from the hydraulic inlet connection 61, 63 to the hydraulic outlet network 62, 64.

Two fluid circuits 71, 72 may have the same distribution circuit 30 or separate distribution circuits 17, 24 according to the examples shown. Reference number 30 is used to denote a distribution circuit in general, reference numbers 9, 17, 24 denoting specific distribution circuits.

According to another feature, when at least two fluid circuits 71, 72 are provided, each fluid circuit 71, 72 may have its own distribution pump 10, 22 connected to the tank 1 by its own hydraulic inlet connection 61, 63, and its own hydraulic outlet network 62, 64.

According to another feature, when at least two fluid circuits 71, 72 are provided, the two fluid circuits 71, 72 may form a main circuit 71 and a back-up circuit 72 that can be used in the event of failure of the main circuit 71.

Figure 4:
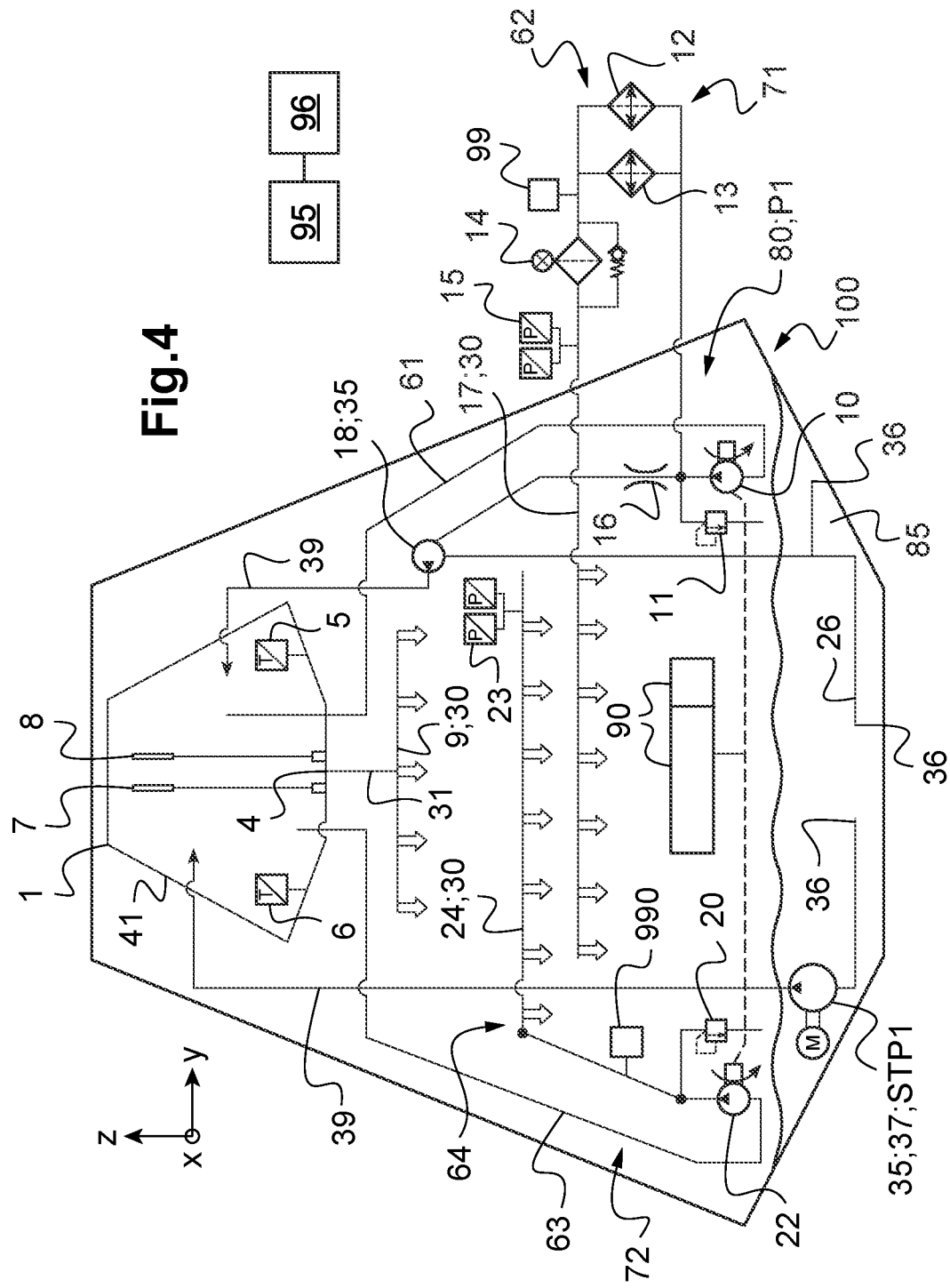
FIG. 4 is a diagram showing a mechanical system according to the disclosure during a starting phase.
Figure 5:
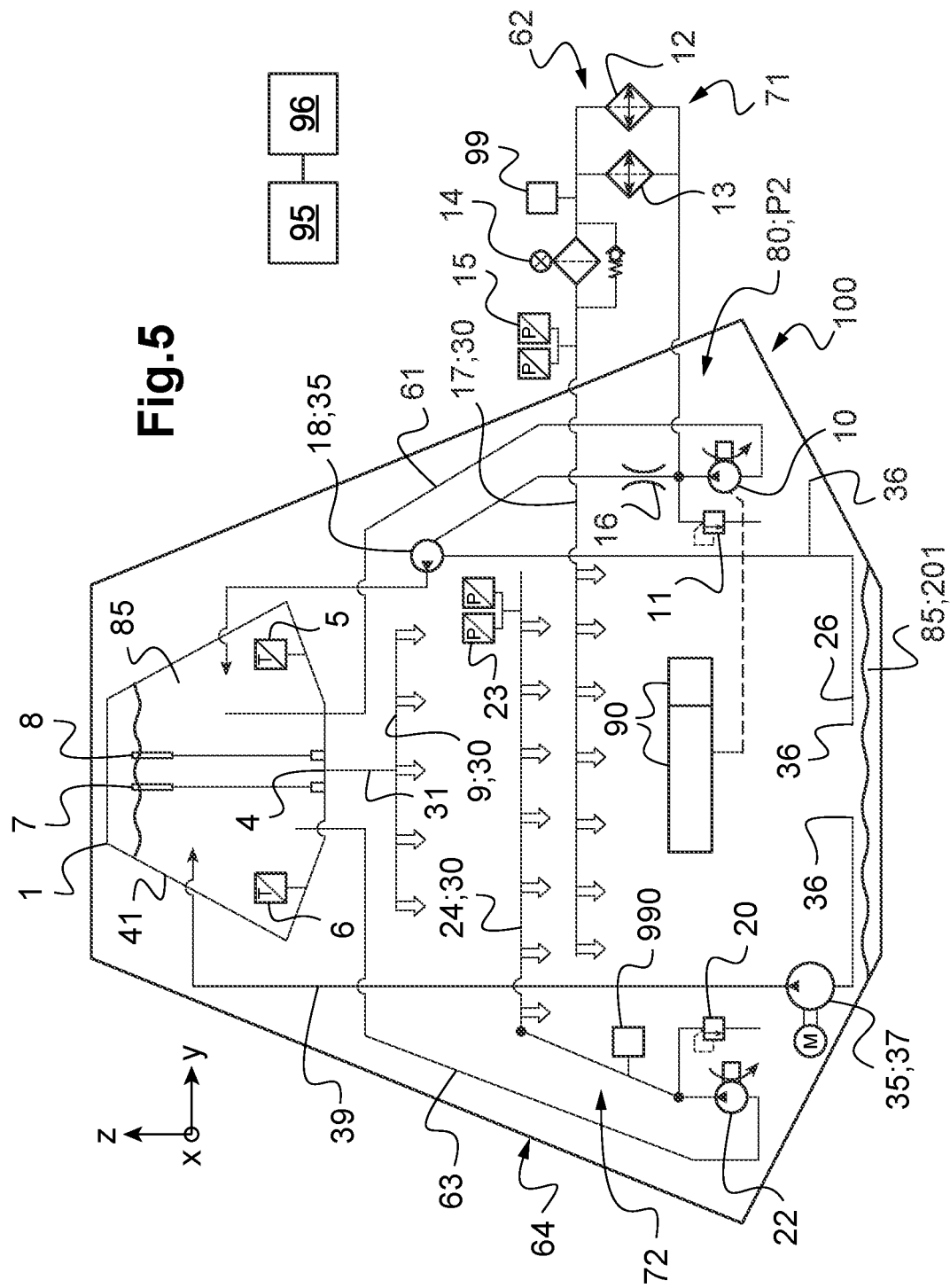
FIG. 5 is a diagram showing the mechanical system of FIG. 4 during a nominal operating phase.

According to another feature, the distribution pump 10, 22 of a fluid circuit 71, 72 may, depending on the embodiment, be connected to the enclosure 41 of the tank 1 according to the example in FIGS. 4 and 5.

Figure 2:
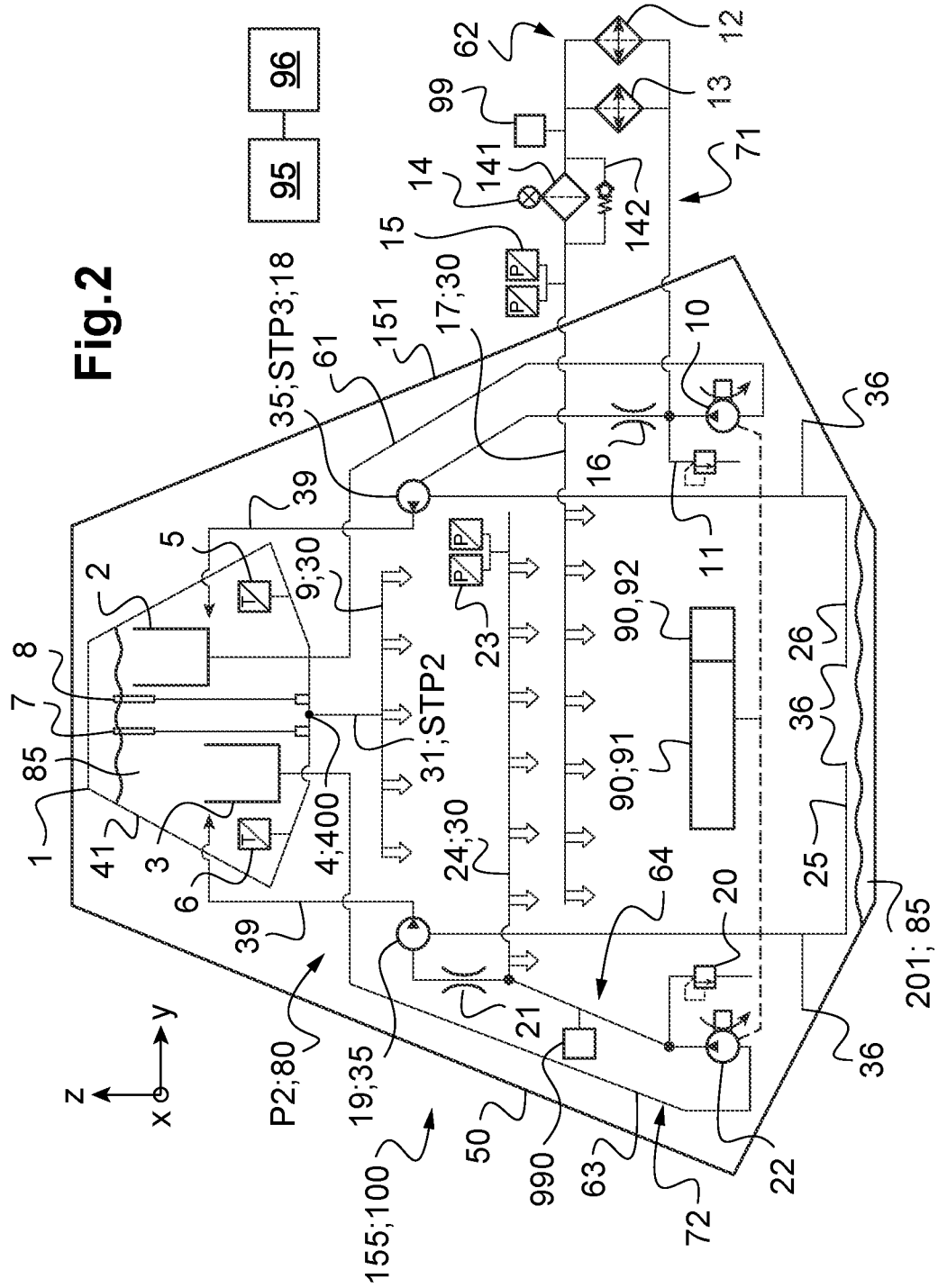
FIG. 2 is a diagram showing the mechanical system of FIG. 1 during a nominal operating phase.
Figure 3:
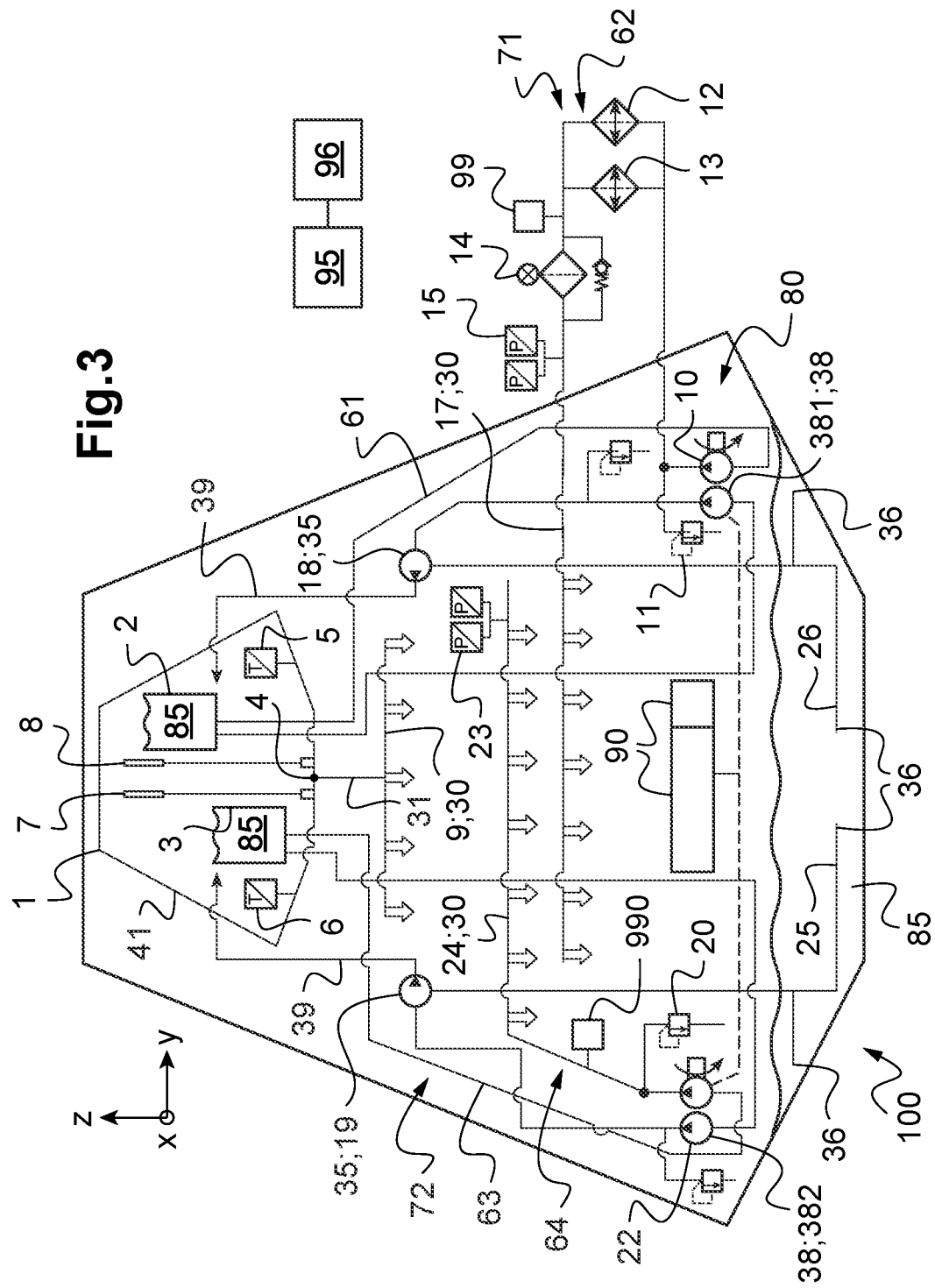
FIG. 3 is a diagram showing a mechanical system according to the disclosure during a starting phase.

Alternatively, the distribution pump 10, 22 of a fluid circuit 71, 72 may be connected to a collector tank 2, 3 of the tank 1 according to the examples of FIGS. 1, 2 and 3. In this case, at least one collector tank 2, 3, or at least one collector tank 2, 3 per fluid circuit 71, 72, is arranged in the enclosure 41. The hydraulic inlet connection 61, 63 then extends from a collector tank 2, 3 to a distribution pump 10, 22.

If there is a main circuit 71 and a back-up circuit 72 cooperating with two respective collector tanks 2, 3, the collector tank 3 connected to the back-up circuit 72 may, for safety reasons, be closer to a low point of the tank 1 than the collector tank 2 connected to the main circuit 71. A leak occurring in an upper section of the enclosure 41 then does not have an impact on the collector tank 3 connected to the back-up circuit 72.

According to another feature, the hydraulic outlet network 62, 64 of a fluid circuit 71, 72 may comprise, upstream of the distribution circuit or circuits 17, 24 of this fluid circuit 71, 72, one or more of the following members: a cooler 12, a heater 13, a filter 14, a pressure relief connection 11, 20 opening into the sump 50, a pressure sensor 15, 23, a particle counter 99, 990. A filter 14 may comprise a filtering member 141 and a bypass connection 142, and a clogging detector. A pressure relief connection may comprise a pressure relief valve opening on the bottom of the sump, or at least a pipe. A particle counter may comprise a standard particle sensor used to count or capture particles circulating in the fluid and, for example, an optical or induction counter. A particle counter may optionally be arranged upstream of a filter.

According to the examples shown, a main fluid circuit 71 comprises a cooler 12, a heater 13, a filter 14, a pressure relief connection 11 opening into the sump 50, a pressure sensor 15. For example, the hydraulic outlet network 62 of the main fluid circuit 71 comprises a first hydraulic connection leaving the distribution pump 10. This first hydraulic connection opens, at a junction, on the pressure relief connection 11 and a second hydraulic connection that leaves the sump to reach the cooler 12 and the heater 13. A third hydraulic connection connects the cooler 12 and the heater 13 to a filter 14, the third connection being able to comprise an optional particle counter 99. This filter 14 opens via a connection returning into the sump on a distribution circuit 17 equipped with a pressure sensor 15. Furthermore, a back-up fluid circuit 72 comprises a pressure relief connection 20 opening into the sump 50 and a pressure sensor 23. A valve may be arranged in the sump upstream of the heater and the cooler.

For example, the hydraulic outlet network 64 of the back-up fluid circuit 72 comprises a first hydraulic connection leaving the distribution pump 22. This first hydraulic connection opens, at a junction, on the pressure relief connection 20 and a second hydraulic connection that reaches a distribution circuit 24 equipped with a pressure sensor 23. The second hydraulic connection may comprise a particle counter 990. The back-up fluid circuit 72 is not provided with a filter, a heater and a cooler in order to limit the risk of leaks.

According to another aspect, the tank 1 may house at least one lubricating fluid level sensor 7, 8 and at least one temperature sensor 5, 6.

The term "sensor" denotes a physical sensing device capable of directly measuring the parameter in question but also a system that may comprise one or more physical sensing devices as well as means for processing the signal that make it possible to provide an estimation of the parameter from the measurements provided by these physical sensing devices.

The various sensors 5, 6, 7, 8, 15, 23 cited above may communicate with a controller 95.

By way of example, the controller 95 may comprise at least one processor and at least one memory, at least one integrated circuit, at least one programmable system, or at least one logic circuit, these examples not limiting the scope to be given to the term "controller". The term "processor" may refer equally to a central processing unit (CPU), a graphics processing unit (GPU), a digital signal processor (DSP), a microcontroller, etc.

The controller 95 may in particular be configured to generate an alert signal transmitted to an alerter 96 capable of generating at least one alert. Each alert may be in the form of a visual alarm, for example emitting a light with a light-emitting diode or an equivalent or one or more characters being displayed on a screen, an audible alarm, via a loudspeaker, and/or a haptic alarm, for example by means of a vibrating unit causing a member held or worn by an individual to vibrate. For example, an alert may be generated when a pressure sensor 15, 23 delivers a signal carrying a pressure lower than a threshold, when a temperature sensor 5, 6 measures a temperature higher than a threshold, when a lubricating fluid level sensor 7, 8 measures a level lower than a threshold.

Irrespective of the preceding examples and in reference to FIG. 1, the lubricating fluid system 80 comprises at least one lift flow generator 35. The lift flow generator 35 is connected by at least one filling line 39 to the tank 1 and to at least one suction point 36 present in the bottom 51 of the sump 50.

The lift flow generator 35 is configured to fill the tank 1 with the lubricating fluid 85 present in the bottom 51 at least during a starting phase P1. The tank 1 may be a leaking tank, having a leakage flow rate less than a supply flow rate of lubricating fluid 85 in the filling line 39.

A lift flow generator 35 may optionally comprise an ejector 18, 19 connected by a respective filling line 39 to the tank 1 and to at least one suction point 36, optionally via a supply line 25, 26.

According to the first embodiment of FIGS. 1 and 2, this ejector 18, 19 is also supplied with lubricating fluid by the hydraulic outlet network 62, 64 of a fluid circuit. An ejector 18, 19 therefore has an outlet hydraulically connected to the tank 1 or to a collector tank 2, 3 by a filling line 39. This ejector 18, 19 also has a first inlet hydraulically connected to a supply line 25, 26 and a second inlet hydraulically connected to the hydraulic outlet network 62, 64.

The hydraulic outlet network 62, 64 optionally comprises a narrowed section 16, 21 between the ejector 18, 19 and the distribution pump 10, 22.

According to the second embodiment of FIG. 3, this ejector 18, 19 is independent, being supplied by a dedicated injection pump 381, 382, the injection pump 381, 382 being connected to a collector tank 2, 3. The injection pump 381, 382 may be a mechanical pump possibly set in motion by the mechanical system 100, or an electromechanical pump.

Figure 6:
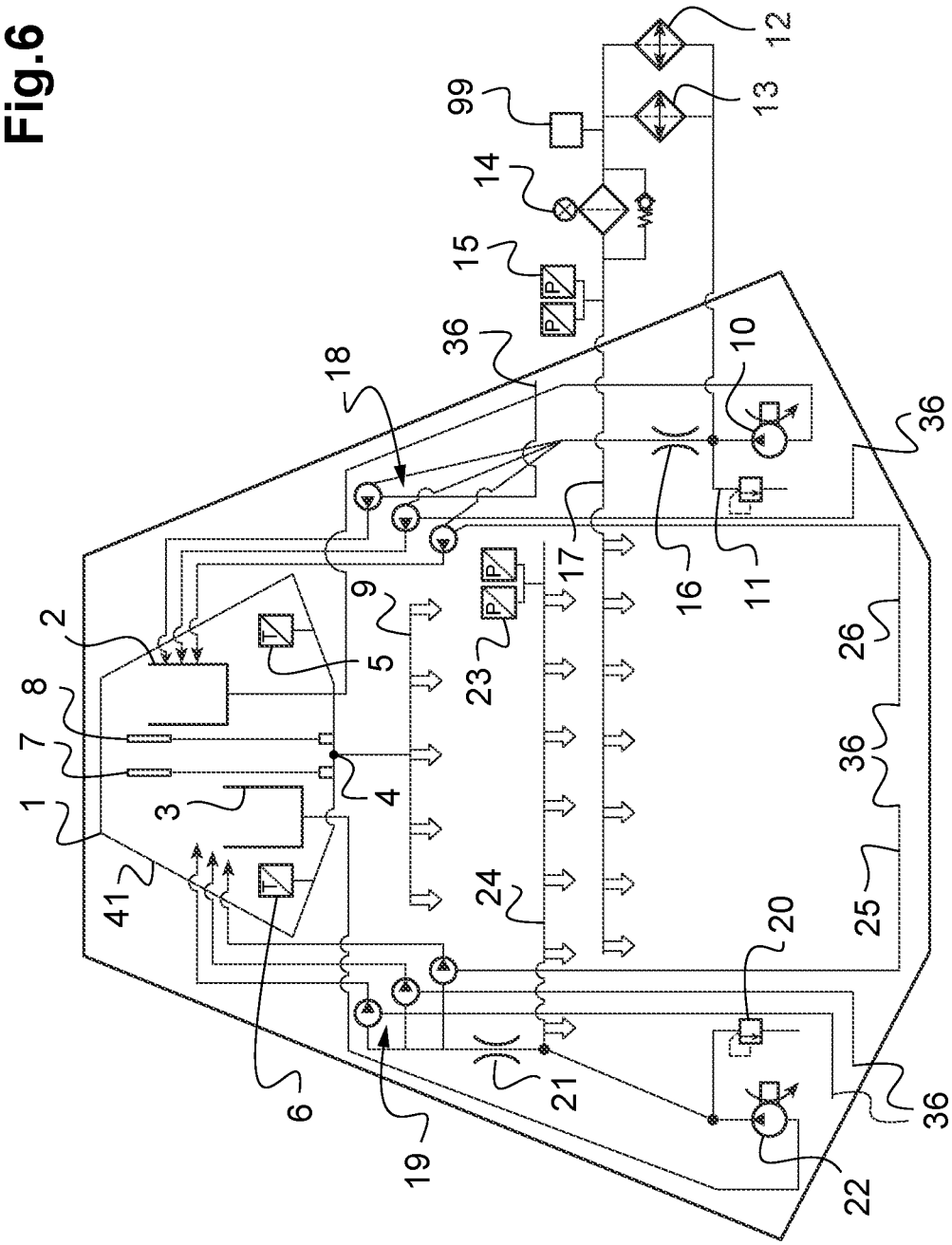
FIG. 6 is a diagram showing the mechanical system provided with several lift flow generators.

FIG. 6 shows a mechanical system provided with several lift flow generators. If applicable, several lift flow generators may be in the form of ejectors optionally communicating with the same pump. If applicable, several lift flow generators may lead to different suction points. According to the example shown, the main circuit 71 comprises several lift flow generators 18 of the ejector type, each hydraulically connected to the tank 1 or to the same collector tank 2 by a filling line 39, to a supply line and to the same hydraulic outlet network 62. Similarly, the back-up circuit 72 comprises several lift flow generators of the ejector type, each hydraulically connected to the tank 1 or to the same collector tank 3 by a filling line 39, to a supply line and to the same hydraulic outlet network 64.

Irrespective of the number of lift flow generators, the first embodiment and the second embodiment operate identically. Regardless of how an ejector 18, 19 of a lift flow generator 35 is supplied with lubricating fluid, and in reference to FIG. 1, the enclosure 41 is empty when at rest. Each collector tank 2, 3 contains a portion of the lubricating fluid 85. Another portion of the lubricating fluid is stored in the bottom 51 of the sump 50 of the mechanical system 100.

During a starting phase P1, the lubricating fluid system 80 implements a step of emptying STP1 the bottom 51 by transferring the lubricating fluid 85 that is in this bottom 51 at rest to the tank 1.

The mechanical system 100 is set in motion by a drive unit that is not shown and is not part of the subject matter of the disclosure. As a result, each distribution pump 10, 22 or injection pump 381, 382, depending on the embodiment, is set in motion. Each distribution pump 10, 22 then draws up the lubricating fluid contained in the respective collector tank 2, 3. Each distribution pump 10, 22 or injection pump 381, 382, depending on the embodiment, then conveys the fluid drawn from the tank 1 to a distribution circuit 17, 24 and at least one ejector 18, 19 forming a lift flow generator 35. Therefore, this ejector 18, 19 draws up the lubricating fluid contained in the bottom 51 and conveys it into the tank 1.

In reference to FIG. 2, during an operating phase P2, the lubricating fluid system 80 implements a step of lubricating STP2 the component or components 90 to be lubricated or cooled with the lubricating fluid 85 contained in the tank 1. Indeed, the lubricating fluid 85 leaves the tank 1 and lubricates the component or components 90. Moreover, each distribution pump 10, 22 draws the lubricating fluid 85 from the tank 1 and transfers it to at least one distribution circuit 17, 24.

Moreover, the lubricating fluid 85 conveyed to the component or components 90 falls by force of gravity into the bottom 51 of the sump 50. Each ejector 18, 19 makes it possible to carry out a step of transferring STP3 the lubricating fluid 85 falling by force of gravity into the bottom 51 to the tank 1.

If a fluid circuit 71, 72 fails, the component or components 90 are lubricated at least by the tank 1 for a minimum time period.

Moreover, the sump 50 comprises, at the end of the starting phase P1, a volume 201 of lubricating fluid 85 less than a predetermined volume allowing the lubricating fluid 85 to splash at least one component 90 to be lubricated or cooled, within the limits of the permitted movement of the mechanical system 100.

According to the embodiments of FIGS. 4 to 5, a lift flow generator 35 may comprise at least one electromechanical priming pump 37 connected to at least one suction point 36 and to the enclosure 41 of the tank 1. The tank 1 may then not be provided with a collector tank. Furthermore, at least one fluid circuit 71, 72 may comprise a lift flow generator 35 of the ejector 18 type. This ejector 18 has an outlet hydraulically connected to the tank 1, a first inlet hydraulically connected to at least one suction point 36 optionally via a supply line 25, and a second inlet hydraulically connected to a distribution pump 10, 22 according to the example shown or a dedicated injection pump 381, 382 connected to the enclosure 41 of the tank 1.

The enclosure 41 is empty or almost empty when at rest.

During the starting phase P1 shown in FIG. 4, the lubricating fluid system 80 implements the step of emptying STP1 the bottom 51 by transferring the lubricating fluid 85 that is in this bottom 51 at rest to the enclosure 41. Each electromechanical priming pump 37 is set in motion, for example on the order of the controller 95, to draw the lubricating fluid 85 from the bottom 51 of the sump 50 and inject it into the tank 1.

The mechanical system 100 may remain stationary.

In reference to FIG. 5, during an operating phase P2, the mechanical system 100 is set in motion. The lubricating fluid system 80 implements a step of lubricating STP2 the component or components 90 to be lubricated or cooled with the lubricating fluid 85 contained in the tank 1. Indeed, the lubricating fluid 85 leaves the tank 1 and lubricates the component or components 90. Moreover, each distribution pump 10, 22 draws the lubricating fluid 85 from the tank 1 and transfers it to at least one distribution circuit 17, 24.

Moreover, the lubricating fluid 85 conveyed to the component or components 90 falls by force of gravity into the bottom 51 of the sump 50. Each ejector 18, 19 makes it possible to carry out a step of transferring STP3 the lubricating fluid 85 that has fallen by force of gravity into the bottom 51 to the tank 1.

If a fluid circuit 71, 72 fails, the component or components 90 are lubricated at least by the lubricating fluid 85 contained in the tank 1 for a minimum time period.

Moreover, the sump 50 comprises, at the end of the starting phase P1, a volume 201 of lubricating fluid 85 less than a predetermined volume allowing the lubricating fluid 85 to splash at least one component 90 to be lubricated or cooled, within the limits of the permitted movement of the mechanical system 100.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

For example, a priming pump may equip the embodiments of FIGS. 1 to 3. According to another example, the embodiments of FIGS. 3 to 6 may comprise several lift flow generators, as in the teaching of FIG. 6.

What is claimed is:

1. A mechanical system comprising a sump and at least one component to be lubricated or cooled arranged in the sump, the mechanical system comprising a lubricating fluid system provided with a lubricating fluid and a tank arranged in the sump, the tank being a leaking tank and being situated above the at least one component to be lubricated or cooled, the lubricating fluid flowing out of the tank by force of gravity so as to reach the at least one component to be lubricated or cooled, the lubricating fluid system comprising at least one lift flow generator connected by at least one filling line to the tank and to at least one suction point present in a bottom of the sump, the lift flow generator being configured to fill the tank with the lubricating fluid present in the bottom at least during a starting phase (P1), wherein the lubricating fluid system comprises at least one fluid circuit provided with a distribution pump connected to the tank by a hydraulic inlet connection, the fluid circuit having a hydraulic outlet network comprising at least one distribution circuit configured to eject the lubricating fluid to the at least one component to be lubricated or cooled, the distribution pump being connected to the hydraulic outlet network and configured to draw the lubricating fluid from the tank and make this lubricating fluid flow from the hydraulic inlet connection to the hydraulic outlet network.

2. The mechanical system according to claim 1, wherein the tank is a leaking tank having a leakage flow rate less than a supply flow rate of lubricating fluid in the filling line.

3. The mechanical system according to claim 1, wherein the mechanical system is configured to be able to move within a predetermined movement space in relation to a reference frame of this mechanical system, the sump comprising, at the end of the starting phase (P1), a volume of lubricating fluid less than a predetermined volume allowing the at least one component to be lubricated or cooled to be at least partially submerged when the mechanical system moves in the predetermined movement space.

4. The mechanical system according to claim 1, wherein the tank comprises a leaking enclosure and at least one collector tank arranged in the enclosure, the collector tank being configured to overflow into the enclosure and be filled with lubricating fluid by the enclosure at the end of the starting phase (P1), the hydraulic inlet connection running from the collector tank to the distribution pump.

5. The mechanical system according to claim 1, wherein the hydraulic outlet network comprises, upstream of the at least one distribution circuit, one or more of the following members: a cooler, a heater, a filter, a pressure relief connection opening into the sump, a pressure sensor, a particle counter.

6. The mechanical system according to claim 1, wherein the at least one lift flow generator comprises at least one electromechanical priming pump connected to at least one suction point and to the tank.

7. The mechanical system according to claim 1, wherein the at least one lift flow generator comprises an ejector having an outlet hydraulically connected to the tank, the ejector having a first inlet hydraulically connected to the at least one suction point, the ejector having a second inlet hydraulically connected to the hydraulic outlet network.

8. The mechanical system according to claim 7,
wherein the hydraulic outlet network comprises a narrowed section between the ejector and the distribution pump.

9. The mechanical system according to claim 1,
wherein the lubricating fluid system comprises at least two fluid circuits opening onto at least one distribution circuit, each fluid circuit being provided with its own distribution pump connected to the tank by its own hydraulic inlet connection and its own hydraulic outlet network.

10. The mechanical system according to claim 9,
wherein the two fluid circuits comprise a main circuit and a back-up circuit that can be used in the event of failure of the main circuit.

11. The mechanical system according to claim 1,
wherein the at least one lift flow generator comprises an ejector having an outlet hydraulically connected to the tank, the ejector having a first inlet hydraulically connected to at least one suction point, the ejector having a second inlet hydraulically connected to an injection pump, the injection pump being hydraulically connected to the tank.

12. The mechanical system according to claim 1,
wherein the at least one lift flow generator comprises several lift flow generators.

13. An aircraft provided with a gearbox setting a rotor in motion,
wherein the gearbox is the mechanical system according to claim 1.

* * * * *